US010270778B2

(12) United States Patent
Klimovs et al.

(10) Patent No.: US 10,270,778 B2
(45) Date of Patent: Apr. 23, 2019

(54) METHODS AND SYSTEMS FOR DYNAMIC CREATION OF ACCESS CONTROL LISTS

(71) Applicant: Google LLC, Mountain View, CA (US)

(72) Inventors: Vjaceslavs Klimovs, Mountain View, CA (US); Daniel Watson, Belmont, CA (US)

(73) Assignee: Google LLC, Mountain View, CA (US)

( * ) Notice: Subject to any disclaimer, the term of this patent is extended or adjusted under 35 U.S.C. 154(b) by 215 days.

(21) Appl. No.: 15/075,458

(22) Filed: Mar. 21, 2016

(65) Prior Publication Data
US 2017/0272442 A1    Sep. 21, 2017

(51) Int. Cl.
*H04L 29/06*    (2006.01)

(52) U.S. Cl.
CPC ............ *H04L 63/101* (2013.01); *H04L 63/20* (2013.01)

(58) Field of Classification Search
CPC ............................. H04L 63/101; H04L 63/20
See application file for complete search history.

(56) References Cited

U.S. PATENT DOCUMENTS

| 7,188,164 B1 | 3/2007 | Etheridge | |
| 7,779,247 B2 | 8/2010 | Roegner | |
| 8,295,198 B2 * | 10/2012 | Newman | H04L 43/18 370/253 |
| 2015/0172320 A1 * | 6/2015 | Colombo | H04L 63/20 726/1 |
| 2015/0269383 A1 | 9/2015 | Lang et al. | |
| 2016/0072814 A1 * | 3/2016 | Martinelli | H04L 63/101 726/1 |

FOREIGN PATENT DOCUMENTS

JP    2006025354 A    1/2006

OTHER PUBLICATIONS

International Search Report and Written Opinion of the International Seraching Authority dated Mar. 14, 2017, in Application No. PCT/US2016/066475.

(Continued)

*Primary Examiner* — Joseph P Hirl
*Assistant Examiner* — Sayed Aresh Beheshti Shirazi
(74) *Attorney, Agent, or Firm* — Lerner, David, Littenberg, Krumholz & Mentlik, LLP (57) ABSTRACT

A method for dynamically creating network access control lists includes, by a processor receiving a request for an access control list (ACL). The method further includes, in response to receiving the request for the ACL: receiving a plurality of resource description from a first data source, receiving a policy enforcement point (PEP) graph for a network from a second data source, and using the plurality of resource descriptions and the PEP graph to generate the ACL, wherein the ACL comprises at least one policy for controlling network traffic through a PEP of the network. Each of the plurality of resource descriptions is associated with a plurality of computing devices in the network, and includes one or more of the following: information corresponding to an Internet Protocol definition of a computing device, information corresponding to desired access of the computing device, and information corresponding to permitted access of the computing device.

20 Claims, 5 Drawing Sheets

(56) References Cited

OTHER PUBLICATIONS

Preda, S. et al., "Dynamic deployment of context-aware access control policies for constrained security sevices", Journal of Systems & Software, Elsevier North Holland, NY, NY, vol. 84, No. 7, Feb. 3, 2011, pp. 1144-1159.
Basile, C. et al., "Network-Level Access Control Policy Analysis and Transformation", IEEE / ACM Transactions on Networking, IEEE / ACM, NY, NY, vol. 20, No. 4, Aug. 14, 2012, pp. 985-998.
International Preliminary Report on Patentability for PCT Application No. PCT/US2016/066475, dated Oct. 4, 2018. 8 pages.
Office Action for Japanese Patent Application No. 2018-529141, dated Oct. 23, 2018.
R. Yavatkar et al. "A Framework for Policy-based Admission Control." Jan. 2000. RFC2753, 18 pages. Retrieved from the Internet: <https://www.ietf.org/rfc/rfc2753.bct>.

* cited by examiner

METHODS AND SYSTEMS FOR DYNAMIC CREATION OF ACCESS CONTROL LISTS

BACKGROUND

In networking, access control lists (ACLs) are utilized by network devices (such as routers, switches, and firewalls) to permit and restrict data flows into and out of network interfaces. An ACL specifies which users or system processes may be granted access to objects, as well as what operations may be allowed on given objects. When an ACL is configured on an interface, the network device analyzes data passing through the interface, compares it to the criteria described in the ACL, and either permits the data flow or prohibits it. ACLs can generally be configured to control both inbound and outbound traffic by limiting user and device access to and from undesired addresses and/or ports. Specifically, ACLs filter network traffic by controlling whether routed packets are forwarded or blocked, typically at a router interface, although other devices can filter packets. An ACL criterion could be the source address of the traffic or the destination address of the traffic, the target port, or protocol, or some combination therein. Typically, Internet Protocol (IP) addresses serve as identifiers of the source device on an IP-based network.

Traditional access control systems use manually maintained and/or configured ACLs. However, considering that a large IP network may have tens of thousands of nodes and hundreds of routers and gateways, manual management and creation of ACLs causes numerous difficulties for such networks because of the resulting large number of ACLs. Furthermore, spatial relationships between ACLs with regard to particular traffic flow are often only known to the ACL management team, and thus traditional network ACLs exist in a vacuum between two arbitrary security domains. This leaves significant opportunity for error when performing manual ACL changes as team members may forget that a particular traffic flow is possible. In addition, manually configured ACLs bear no explicit connection to the service or environment they are tasked to protect, and removal or addition of the service on either side of the ACL has no effect on the ACL itself. These leads to significant ACL maintenance issues because unbeknownst to the ACL management team, a particular access control entry might over time become used by a new set of services.

The current disclosure discloses a system and method for automatic creation of dynamic access control lists to address the issues discussed above.

SUMMARY

In an embodiment, a method (and system) for dynamically creating network access control lists may include by a processor receiving a request for an access control list (ACL). The method may also include in response to receiving the request for the ACL: receiving a plurality of resource descriptions from a first data source, receiving a policy enforcement point (PEP) graph for the network from a second data source, and using the plurality of resource descriptions and the PEP graph to generate the ACL, wherein the ACL comprises at least one policy for controlling network traffic through a PEP of the network, wherein the network comprises one or more PEPs. Each of the plurality of resource descriptions may be associated with a plurality of computing devices in a network, and may include one or more of the following: information corresponding to an Internet Protocol (IP) definition of a computing device, information corresponding to desired access of the computing device, and information corresponding to permitted access of the computing device.

In an embodiment, receiving the request for the ACL may include receiving the request from one or more of the following: a PEP of the network, wherein the PEP receives communications from and sends communications to one or more ports of the plurality of computing devices in the network, a computing device in the network, a computing device associated with a user. In certain embodiments, receiving the request for the ACL may include receiving the request from the PEP of the network in response to receiving a data packet from a first computing device to be delivered to a second computing device at the PEP. The method may also include, receiving, at the PEP: the generated ACL, parsing the ACL to determine whether the at least one policy allows the data packet to be delivered to the second computing device, and using results of the parsing to decide whether to block or deliver the data packet to the second computing device, and in response either blocking or delivering the data packet. The request for the ACL may also include information from the data packet. In certain embodiment, the information from the data packet may include one or more of the following: an IP address of a source computing device, an IP address of a destination computing device, a MAC address, a time stamp, an identifier of the PEP, protocol information, source computing device port information, or destination computing device port information.

In at least one embodiment, using the plurality of resource descriptions and the policy enforcement point graph to generate the ACL may include identifying a plurality of paths between the computing devices of the network, using the resource descriptions to discard a subset of the plurality of paths to generate a PEP vector, and using the policy enforcement point vector to generate the ACL. Each of the plurality of paths encompasses at least one PEP on the PEP graph. In some embodiments, using the resource descriptions to discard a subset of the plurality of paths may include, for each of the plurality of the paths: identifying a source computing device for each of the plurality of paths, identifying a destination computing device for each of the plurality of paths, using information corresponding to desired access for the source computing device and information corresponding to permitted access for the destination computing device to determine whether network traffic is allowed on a path. The system may discard the path if network traffic is not allowed.

In an embodiment, the information corresponding to the IP definition of the computing device comprises a query to a data source for one or more of the following: an IP address of the computing device, a domain name, or a MAC address.

In an embodiment, the information corresponding to desired access of the computing device comprises one or more of the following: identifying information of one or more destination computing devices that the computing device wishes to connect to, identifying information of one or more services of the one or more destination computing devices that the computing device wishes to connect to, permitted protocol information corresponding to the one or more services, or permitted port information corresponding to the one or more services.

In another embodiment, the information corresponding to permitted access of the computing device comprises one or more of the following: identifying information of one or more services provided by the computing device, identifying information of one or more source computing devices to which the computing device grants access permission to, permitted protocol information corresponding to the one or more provided services, permitted port information corresponding to the one or more provided services, or a time limit for each of the one or more provided services.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

The following terms shall have, for purposes of this application, the respective meanings set forth below:

An "access control list" or "ACL" refers to a file system construct used to control the flow of traffic through network devices in order to protect networks from unauthorized access. Examples may include, without limitation, such as gateways, routers, switches, firewalls, or the like. An ACL determines whether or not network traffic (such as a data packet, a bit stream, or the like) should be allowed to pass through the network device and on to one or more computing devices that are in communication with the network device. This network traffic is usually transmitted in the form of data packets, which have embedded in them the network address of both the source and destination systems. An ACL includes a list of rules, which may indicate one or more attributes of a data packet and a list of actions corresponding to the attributes of the data packet. Attributes of the data packet may include information derived from, for example, the Internet Protocol (IP) and Transmission Control Protocol (TCP) headers, including a combination of Ethernet frame (MAC) fields, IP addresses and TCP port and protocol information.

A "network device" refers to a device that permits communication between and among various computing devices using a network so that they can share files and resources. Examples may include, without limitation gateways, hubs, bridges, routers, wireless access points, modem, switches, firewalls, or the like. A network device may include a "policy enforcement point" (PEP) on which network policy decisions are carried out or enforced. It should be noted that while the current disclosure discusses a network device as a PEP, a PEP may be applied on any physical or virtual device, which may not be a network device, without deviating from the principles of the current disclosure.

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like. Various elements of an example of a computing device or processor are described below in reference to FIG. 5.

Figure 1:
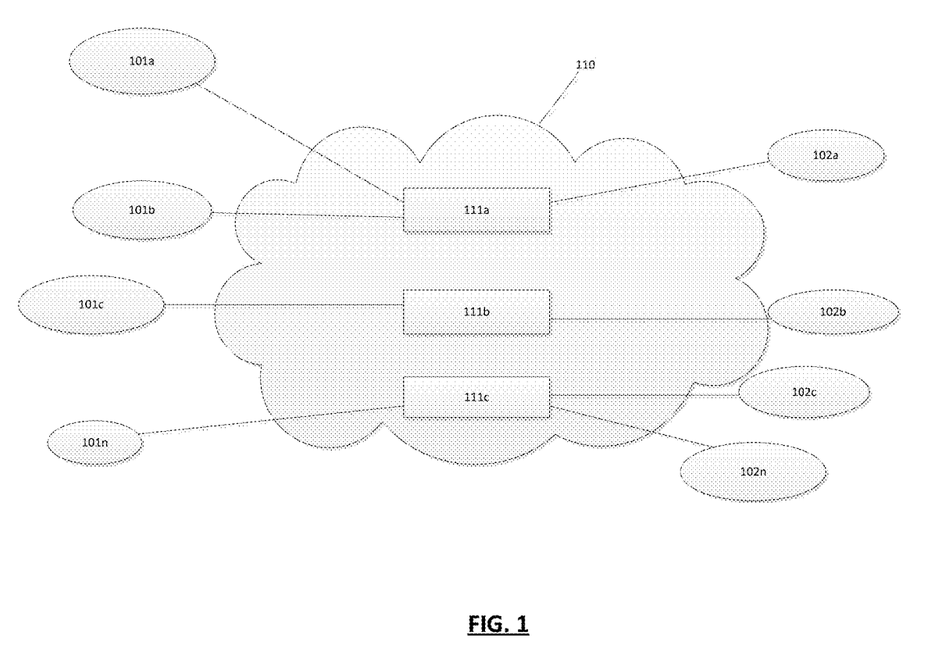
FIG. 1 is an example block diagram of a network system for creation of dynamic access control lists, according to an embodiment.

FIG. 1 is a block diagram of one embodiment of a networked computer system. In the embodiment of FIG. 1, multiple source computing devices 101a, 101b, 101c . . . 101n are in communication with one or more network devices 111a, 111b, and 111c, via a network 110. In one embodiment, the network 110 may comprise one or more wired and/or wireless networks, such as one or more local area networks (LANs), wide area networks (WANs), and/or the Internet. In an embodiment, the system may include more than one networks, and may include a combination of public and private networks. In an embodiment, the system may include a wide variety of network environments (represented by network 110) including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc.

In the embodiment of FIG. 1, network devices 111a, 111b, and 111c receive all of the packets destined for one or more of the destination computing devices 102a, 102b, 102c . . . 102n. Hence, a source computing device and a destination computing device on the networked system are separated by one or more network devices which are configured to facilitate the communications on the network. The network devices 111a, 111b, and 111c are configured to determine a destination for each incoming packet and route the incoming packet to the appropriate destination. In certain embodiments, the network devices 111a, 111b, and 111c may be configured to act as PEPs and may receive and/or generate dynamic ACLs (as discussed below). The network devices may also analyze the attributes of incoming and/or outgoing packets (such as protocol, source address, destination address, or the like) and use the dynamic ACL rules to selectively block unwanted packets from passing through. A network device may also include plurality of ports (input ports and/or output ports) for communicatively interconnecting network devices to each other and to network 110. A network device is configured to channel data units, such as data packets, bit streams or frames, between any two devices that are attached to it up to its maximum number of ports.

A network device typically includes a plurality of interfaces that define how the network device controls the flow of packets at, or sent from, the respective interface using an ACL. As discussed above, an ACL includes a list of information that a network device may use to determine whether packets arriving at or sent from a particular interface may be communicated across the network device. For example, an ACL may include a list of IP addresses and types of allowable protocols for that IP address. In another example, the ACL may include a list of IP addresses and port identifiers. In either example, a specific entry in the ACL may control permission or denial of communication based on one or more fields in a packet.

One or more computing devices (source or destination) of the system may have a resource description associated with it. In an embodiment, a resource description of a computing device may include, without limitation, information relating to an IP definition (such as an IP address) of the computing device, information corresponding to desired access, and information corresponding to permitted access. In certain embodiments, the resource definition may also optionally include text description describing what the computing device and/or the offered services represent.

In an embodiment, information relating to an IP definition of the computing device may include a query to an authoritative data source for retrieving the IP definition. In an embodiment, an IP definition identifies a section of a network as a source or destination for traffic flows, such as a source computing device or a destination computing device. Examples may include without limitation, an IP address, a domain name, a MAC address, and/or the like.

In an embodiment, information corresponding to desired access includes information regarding connections sought with other computing devices i.e., a desire to connect to one or more services provided by other computing devices. For example, in an embodiment, information corresponding to permitted access may include identifying information of a computing device, identification information of a service provided by a computing device, protocol and/or port information of a computing device (and/or a service), and/or the like.

In an embodiment, information corresponding to permitted access includes information regarding the computing device's exposure, i.e., availability of one or more services and/or resources (such as data files, web access, printer service, routing services, sensors, and/or the like) of the computing device to other computing devices and the service-related specific computing device, port and/or protocol specifications. For example, in an embodiment, information corresponding to permitted access may include the identification of services provided, identification of computing devices to which services are provided, identification of the correct ports and protocols, time limit for providing a service, etc.

In an embodiment, data structures defining the resource descriptions may be stored in a hierarchy similar to a file system in two data bearing nodes: resource nodes (information corresponding to desired access) and exposure nodes (information corresponding to permitted access). A resource node may also include information relating to an IP address of the computing device. Other types of data structures such as, for example, matrices are within the scope of this disclosure.

The system also includes a computer-readable medium containing programming instructions that, when executed, causes a processor to generate and maintain a dynamic ACL and send it to the PEP(s). The computer-readable medium may be a memory unit of a network device, or a memory of another device such as a remote system (not shown here) that is in communication with the network device. The system may also include and/or have access to one or more data storage systems. The system may also include and/or have access to one or more data sources.

Figure 2:
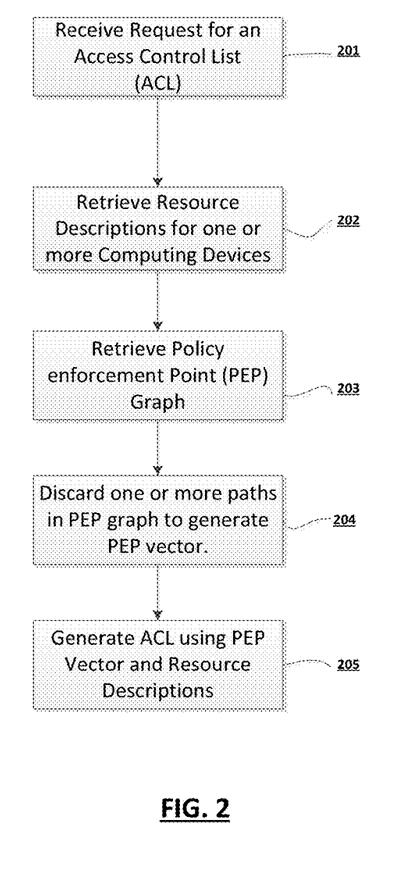
FIG. 2 illustrates an example flowchart for the process of generating dynamic access control lists, according to an embodiment.

FIG. 2 shows an example flowchart diagram 200 for creating a dynamic ACL, according to an embodiment. In step 201, the system may receive a request for an ACL.

In an embodiment, the system may receive the request from a PEP of a network every time a network PEP receives data (such as packets) or network traffic for transmission to a computing device and/or another node of the network, such as a PEP. In an embodiment, the request may also include information, such as an identifier associated with the PEP, information extracted from the data or network traffic received at the PEP, or the like. Information extracted from the data packets may include, without limitation, Internet protocol (IP) addresses including source address, destination address, source and destination TCP/UDP ports, MAC addresses, timestamps, a PEP identifier, etc.

Alternatively and/or additionally, the system may receive a request for an ACL from a user such as a network administrator, or the like. In an embodiment, the system may also receive a request for an ACL from a computing device.

In response to receiving the request, the system may receive 202 resource descriptions associated with one or more computing devices of the network. In an embodiment, the system may analyze the information received in the request for an ACL to identify the computing devices for which it may receive the resource descriptions. For example, if the request for an ACL is received from a PEP and includes packet information such as a source address and a destination address, the system may receive resource descriptions associated with the source computing device and the destination computing device. Alternatively and/or additionally, the system may receive resource descriptions associated with the computing devices on a network associated with the PEP from which the request was received. In another embodiment, the system may receive resource descriptions associated with the computing devices of networks associated with the PEPs that a data packet may traverse based on a path in a PEP graph (discussed below). As discussed above, the resource descriptions may include, without limitation, information relating to an IP definition (such as an IP address) of the computing device, information corresponding to desired access, and information corresponding to permitted access.

For instance, for an example network that includes A, B, and C computing devices that provide certain services in a uniform way, for example via a set of IP addresses and listening ports, resource definitions may include the set of IP addresses and the ports. The resource definitions may also include information corresponding to desired access and permitted access for each corresponding device, such as for example:

A allows connections from B and C (permitted access for computing device A)

B allows connections from C (permitted access for computing device B)

C allows connections from A (permitted access for computing device C)

A requires no access to B or C (desired access for computing device A)

B requires access to A and C (desired access for computing device B)

C requires access to A (desired access for computing device C)

The system may also receive 203 (and/or generate) a PEP graph for the network. A PEP graph defines a spatial relationship between computing devices of a network, as defined by the associated resource descriptions and the network PEPs. It should be noted that a PEP graph is independent of a network topology that defines the arrangement of various elements (such as links, nodes, etc.) of a computer network.

In an embodiment, a PEP graph may include one or more paths between computing devices of a network such that each path traverses at least one PEP. Examples of methods that may be used to generate all possible paths between computing devices that provide access to one or more of their services may include, without limitation, breadth first search algorithm, depth first search algorithm, or the like.

Figure 3:
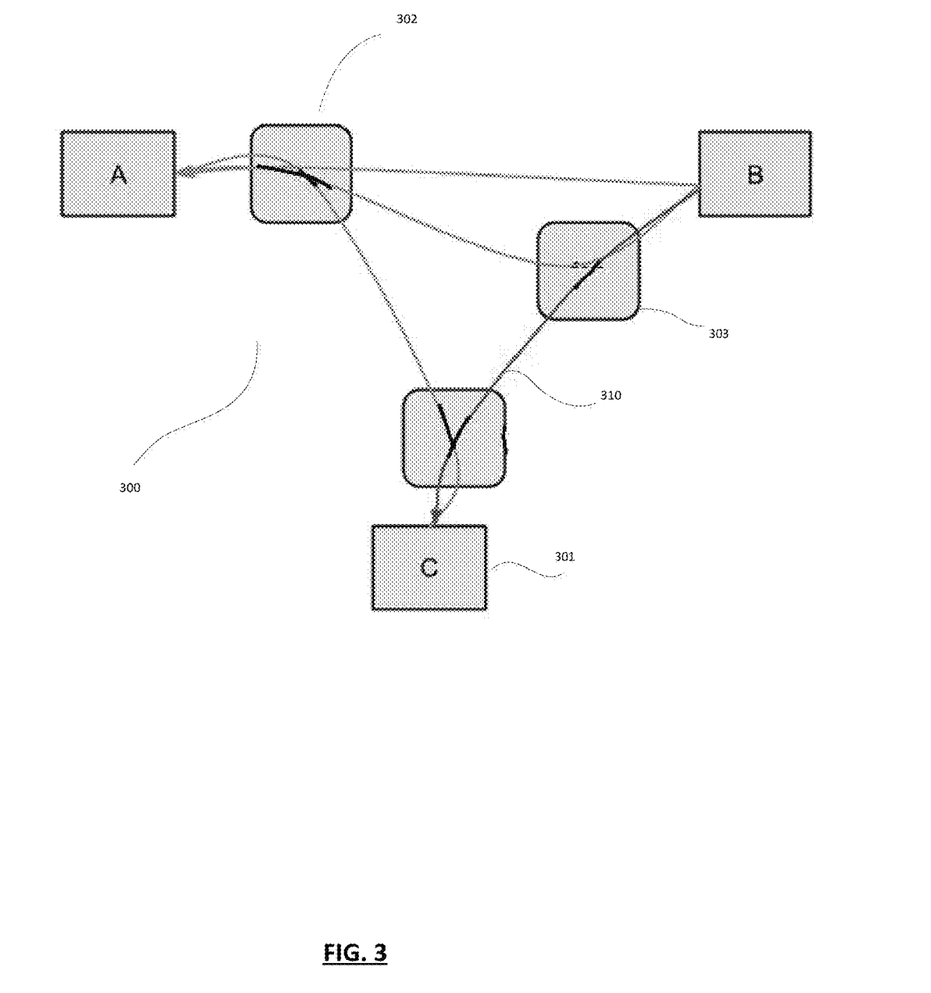
FIG. 3 illustrates an example policy enforcement point (PEP) graph, according to an embodiment.

Additionally, a PEP graph may also include PEP description for each PEP in the PEP graph. PEP description may include, without limitation, a PEP identifier, information corresponding to the type of the PEP, any additional metadata about the PEP, prefix/postfix information (for specifying information to be prepended or postpended to a generated portion of an ACL when the information cannot be expressed as a flow and/or relationship between resources or computing devices), and the like. FIG. 3 illustrates an example PEP graph 300 for the above discussed example network. As shown in FIG. 3, a PEP graph 300 may include a plurality of paths between computing devices A, B, and C, and each path traverses one or more of the PEPs 301, 302, and 303.

Figure 4:
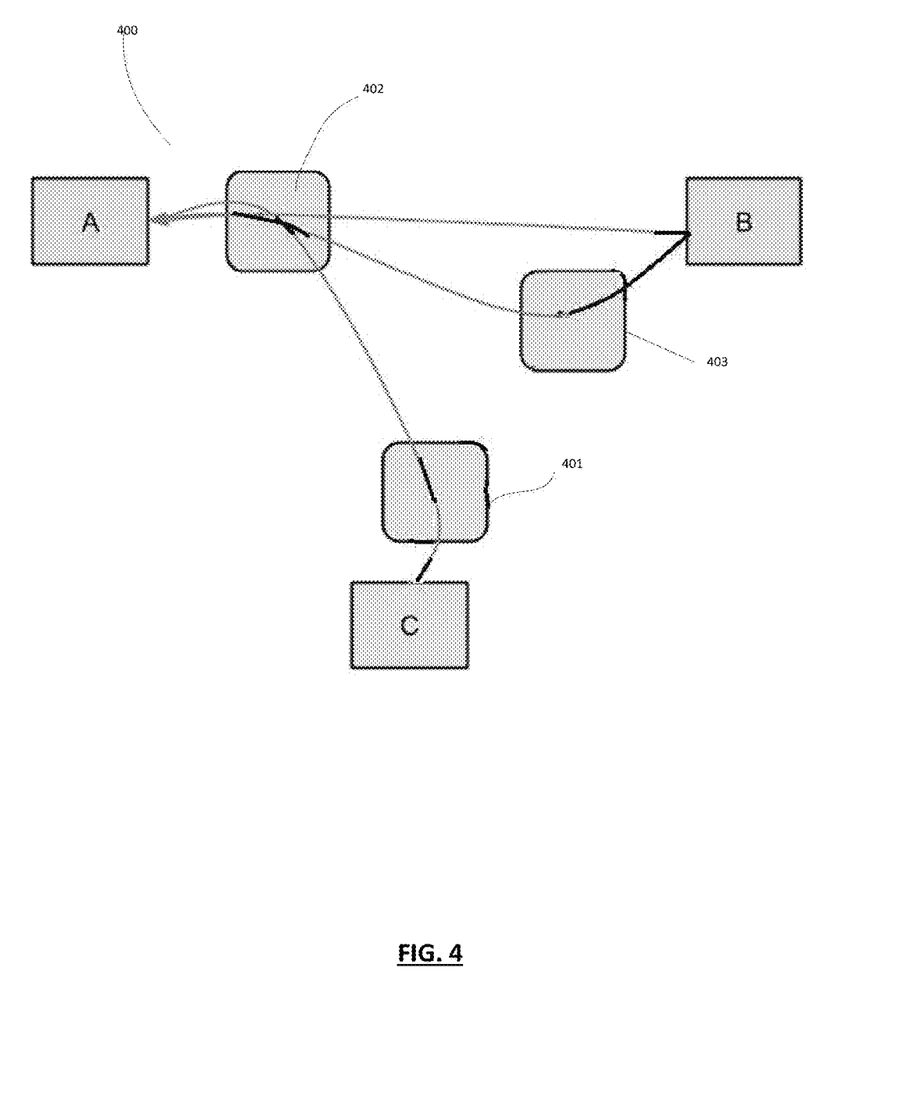
FIG. 4 illustrates an example PEP vector, according to an embodiment.

Referring back to FIG. 2, the system may then use resource descriptions for computing devices to discard 204 one or more paths in the PEP graph to generate a PEP vector that includes only the allowed paths in the PEP graph. A PEP vector also specifies the PEPs that lie on a path between computing devices. In an embodiment, the system may identify a source computing device and a destination computing device for each path. The system may then use the desired access information of the source computing device, and the permitted access information of the destination computing to determine whether network traffic is allowed on the path. The system may discard the paths through which network traffic is not allowed. For example, the system may discard a path between two computing devices if the destination computing device does not permit access to its resources by the other computing device. In another example, the system may discard a path between two computing devices if the source computing device does not desire access to the resources of the other computing device. Similarly, the system may discard paths to and/or from a computing device that do not match the protocol, port, or other specifications of the computing device. FIG. 4 illustrates an example PEP vector 400 for the above discussed example network generated by removing path 310 from the PEP graph 300 of FIG. 3 because C does not permit access from B. As such, there are two paths between A and B that traverse PEPs 402 and/or 403, one path between C and A that traverses PEPs 401 and 402, and no paths between C and B.

The system may then generate 205 an ACL for each PEP using the resource descriptions and the generated PEP vector, by saving properties and policies of each path traversing a PEP. In an embodiment, the system may use reasonable assumptions in generating an ACL. For example, the system may assume that connections are always initiated from high ports. The system may use "default deny" for allowing only declared and permissible access at a PEP.

Example ACL policies generated for the above example network with a PEP vector 400 using the resource descriptions would be as follows:

ACL policies for PEP 301:

| Protocol | Source IP | Source Port | Destination IP | Destination Port |
|---|---|---|---|---|
| TCP | IPs of C | High ports | IPs of A | Ports of A |
| | | Default Deny | | |

ACL policies for PEP 302:

| Protocol | Source IP | Source Port | Destination IP | Destination Port |
|---|---|---|---|---|
| TCP | IPs of C | High ports | IPs of A | Ports of A |
| TCP | IPs of B | High ports | IPs of A | Ports of A |
| | | Default Deny | | |

ACL policies for PEP 303:

| Protocol | Source IP | Source Port | Destination IP | Destination Port |
|---|---|---|---|---|
| TCP | IPs of B | High ports | IPs of A | Ports of A |
| | | Default Deny | | |

As discussed above, default deny only allows declared and permissible access at a PEP. For example, according to the above generated ACL policies, PEP 301 will only allow network traffic generated by C and destined for A, via the defined protocols and ports, and will deny all other network traffic or access requests. Similarly, PEP 302 will only allow access from C to A, and from B to A, via the respective defined protocols and ports, and PEP 303 will only allow access from B to A via the defined protocols and ports.

In an embodiment, when a PEP of the network receives a request from a first computing device to access a service or a resource of a second computing device (or a data packet destined for), the PEP may request a dynamic ACL, and use the dynamic ACL to determine whether or not it should accept or deny the request for access. Specifically, the PEP may use a generated dynamic ACL to block or transmit data packets in a network.

In an embodiment, the system may format the above generated ACL policies to a vendor specific syntax compatible with a PEP.

In an embodiment, a user may make changes to the ACL policies by defining a PEP graph and/or by adjusting resource descriptions, such that the system will automatically generate a modified ACL. The resource descriptions may be adjusted by changing IP definitions of the computing devices, by changing information corresponding to permitted access for a computing device, or by changing information corresponding to desired access for a computing device (while the decision to allow certain access rests with a computing device that is receiving connections, both the receiving end and the initiating end of a path need to declare such connectivity).

Figure 5:
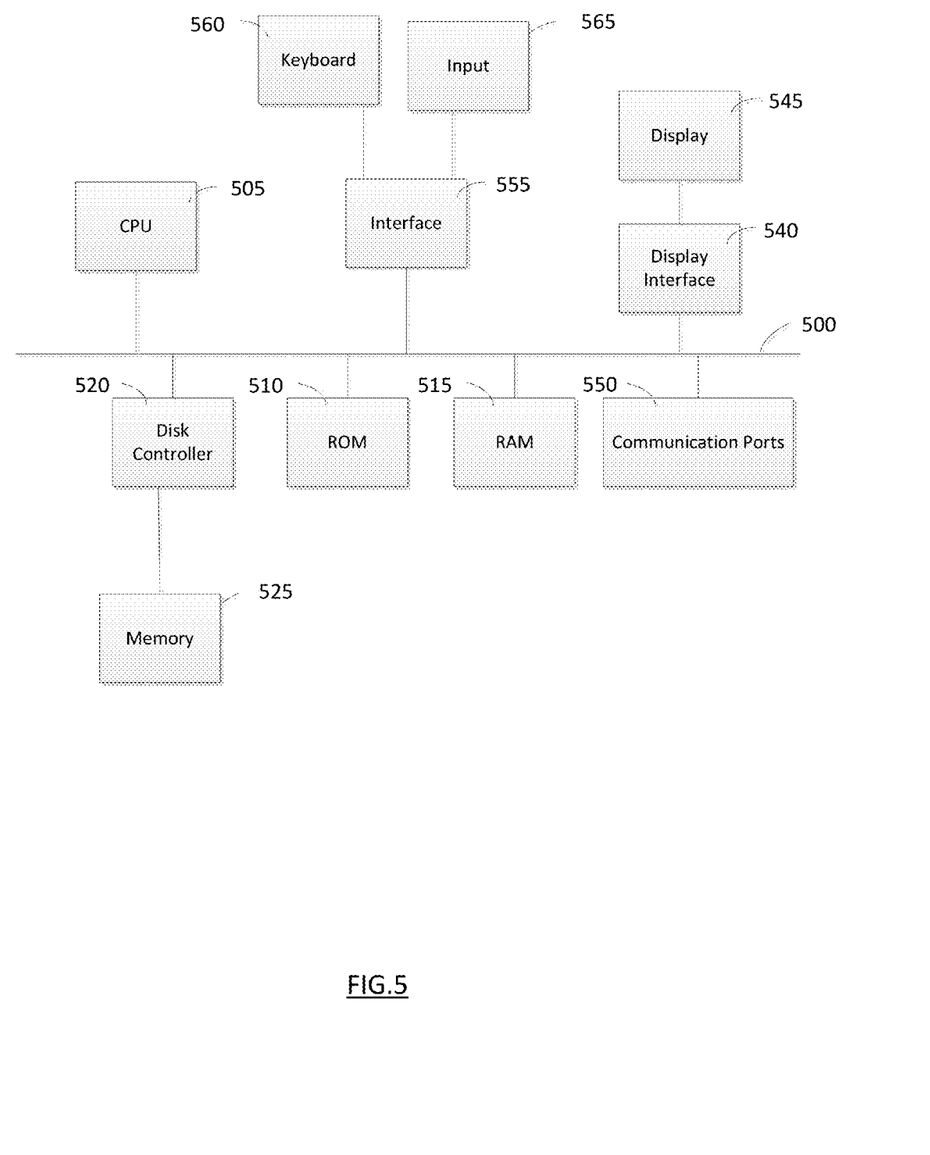
FIG. 5 illustrates a block diagram of example hardware that may be used to contain or implement program instructions according to an embodiment.

FIG. 5 depicts a block diagram of an example of internal hardware that may be used to contain or implement program instructions, such as the process steps discussed above, according to embodiments. A bus 500 serves as an information highway interconnecting the other illustrated components of the hardware. CPU 505 represents one or more processors of the system, performing calculations and logic operations required to execute a program. CPU 505, alone or in conjunction with one or more of the other elements disclosed in FIG. 5, is an example of a processing device, computing device or processor as such terms are used within this disclosure. Read only memory (ROM) 510 and random access memory (RAM) 515 constitute examples of memory devices or processor-readable storage media.

A controller 520 interfaces with one or more optional tangible, computer-readable memory devices 525 to the system bus 500. These memory devices 525 may include, for example, an external or internal disk drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer readable medium 525 such as a compact disk, a digital disk, flash memory, a memory card, a USB drive, an optical disc storage medium, such as a Blu-Ray™ disc, and/or other recording medium controlled via a disk controller 520

An optional display interface 540 may permit information from the bus 500 to be displayed on the display 545 in audio, visual, graphic or alphanumeric format. Communication with external devices, such as a printing device, may occur using various communication ports 550. A communication port 550 may be attached to a communications network, such as the Internet or an intranet.

The hardware may also include an interface 555 which allows for receipt of data from input devices such as a keyboard 560 or other input device 565 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method for dynamically modifying network access control lists, comprising:
  by a processor:
    receiving a request for an access control list (ACL);
    in response to receiving the request for the ACL:
      receiving, from a first data source, a plurality of resource descriptions, wherein each of the plurality of resource descriptions is associated with a plurality of computing devices in a network, and wherein each of the plurality of resource descriptions comprises one or more of the following:
        information corresponding to an Internet Protocol (IP) definition of a computing device,
        information corresponding to desired access of the computing device, and
        information corresponding to permitted access of the computing device,
      receiving, from a second data source, a policy enforcement point graph for the network,
      using the plurality of resource descriptions and the policy enforcement point graph to generate the ACL, wherein the ACL comprises at least one policy for controlling network traffic through a policy enforcement point (PEP) of the network, wherein the network comprises one or more PEPs, and wherein the policy enforcement point graph defines a spatial relationship between the plurality of computing devices in the network based on the plurality of resource descriptions and the one or more PEPs,
      transmitting the generated ACL to at least one PEP of the network,
      causing the at least one PEP of the network to block or deliver one or more data packets to a computing device of the network based on the ACL; and
      modifying the ACL based on changes to the resource descriptions and the spatial relationship between the plurality of computing devices in the network.

2. The method of claim 1, wherein receiving the request for the ACL comprises receiving the request from one or more of the following:
  a PEP of the network, wherein the PEP receives communications from and sends communications to one or more ports of the plurality of computing devices in the network;
  a computing device in the network; or
  a computing device associated with a user.

3. The method of claim 2, wherein receiving the request for the ACL comprises receiving the request from the PEP of the network in response to receiving, at the PEP, a data packet from a first computing device to be delivered to a second computing device.

4. The method of claim 3, further comprising:
  receiving, at the PEP, the ACL;
  parsing, at the PEP, the ACL to determine whether the at least one policy allows the data packet to be delivered to the second computing device; and
  using results of the parsing to decide, at the PEP, whether to block or deliver the data packet to the second computing device, and in response either blocking or delivering the data packet.

5. The method of claim 1, wherein using the plurality of resource descriptions and the policy enforcement point graph to generate the ACL comprises:
  identifying a plurality of paths between the computing devices of the network, wherein each of the plurality of paths encompasses at least one PEP on the policy enforcement point graph;
  using the plurality of resource descriptions to discard a subset of the plurality of paths to generate a policy enforcement point vector; and
  using the policy enforcement point vector to generate the ACL.

6. The method of claim 5, wherein using the plurality of resource descriptions to discard a subset of the plurality of paths comprises, for each of the plurality of the paths:
  identifying a source computing device for each of the plurality of paths;
  identifying a destination computing device for each of the plurality of paths;
  using information corresponding to desired access for the source computing device and information corresponding to permitted access for the destination computing device to determine whether network traffic is allowed on a path; and
  discarding the path if network traffic is not allowed.

7. The method of claim 1, wherein the information corresponding to the IP definition of the computing device comprises a query to a data source for one or more of the following: an IP address of the computing device, a domain name, or a media access controller (MAC) address.

8. The method of claim 1, wherein the information corresponding to desired access of the computing device comprises one or more of the following:
   identifying information of one or more destination computing devices that the computing device wishes to connect to;
   identifying information of one or more services of the one or more destination computing devices that the computing device wishes to connect to;
   permitted protocol information corresponding to the one or more services; or
   permitted port information corresponding to the one or more services.

9. The method of claim 1, wherein the information corresponding to permitted access of the computing device comprises one or more of the following:
   identifying information of one or more services provided by the computing device;
   identifying information of one or more source computing devices to which the computing device grants access permission to;
   permitted protocol information corresponding to the one or more services provided by the computing device;
   permitted port information corresponding to the one or more provided services; or
   a time limit for each of the one or more provided services.

10. The method of claim 3, wherein the request for the ACL further comprises information from the data packet, and wherein the information from the data packet comprises one or more of the following:
    an IP address of a source computing device;
    an IP address of a destination computing device;
    a media access controller (MAC) address;
    a time stamp;
    an identifier of the PEP;
    protocol information;
    source computing device port information; or
    destination computing device port information.

11. A system for dynamically modifying network access control lists, comprising:
    a plurality of computing devices;
    a network comprising a plurality of point policy enforcement point (PEP)s;
    a processor in communication with the plurality of computing devices via the network; and
    a computer-readable medium containing programming instructions that are configured to, when executed by the processor, cause the processor to:
       receive a request for an access control list (ACL); and
       in response to receiving the request for the ACL:
          receive, from a first data source, a plurality of resource descriptions, wherein each of the plurality of resource descriptions associated with the plurality of computing devices, and wherein each of the plurality of resource descriptions comprises one or more of the following:
             information corresponding to an Internet Protocol (IP) definition of a computing device,
             information corresponding to desired access of the computing device, and
             information corresponding to permitted access of the computing device,
          receive, from a second data source, a policy enforcement point graph for the network,
          use the plurality of resource descriptions and the policy enforcement point graph to generate the ACL, wherein the ACL comprises at least one policy for controlling network traffic through a PEP of the plurality of PEPs of the network, and wherein the policy enforcement point graph defines a spatial relationship between the plurality of computing devices in the network based on the plurality of resource descriptions and one or more PEPs,
          transmit the generated ACL to at least one of the plurality of PEPs,
          by the at least one PEP, block or deliver one or more data packets to a computing device of the network based on the ACL, and
          modify the ACL based on changes to the resource descriptions and the spatial relationship between the plurality of computing devices in the network.

12. The system of claim 11, wherein the programming instructions that are configured to cause the processor to receive the request for the ACL comprise programming instructions that are configured to cause the processor to receive the request from one or more of the following:
    a PEP of the network, wherein the PEP receives communications from and sends communications to one or more ports of the plurality of computing devices in the network;
    a computing device in the network; or
    a computing device associated with a user.

13. The system of claim 12, wherein the programming instructions that are configured to cause the processor to receive the request for the ACL comprise programming instructions that are configured to cause the processor to receive the request from the PEP of the network in response to receiving, at the PEP, a data packet from a first computing device to be delivered to a second computing device.

14. The system of claim 13, further comprising additional programming instructions that are configured to, when executed by the processor, cause the processor to:
    receive, at the PEP, the ACL;
    parse, at the PEP, the ACL to determine whether the at least one policy allows the data packet to be delivered to the second computing device; and
    use results of the parsing to decide, at the PEP, whether to block or deliver the data packet to the second computing device, and in response either blocking or delivering the data packet.

15. The system of claim 11, wherein the programming instructions that are configured to cause the processor to use the plurality of resource descriptions and the policy enforcement point graph to generate the ACL comprise programming instructions that are configured to cause the processor to:
    identify a plurality of paths between the computing devices of the network, wherein each of the plurality of paths encompasses at least one PEP on the policy enforcement point graph;
    use the plurality of resource descriptions to discard a subset of the plurality of paths to generate a PEP vector; and
    use the policy enforcement point vector to generate the ACL.

16. The system of claim 15, wherein the programming instructions that are configured to cause the processor to use the plurality of resource descriptions to discard a subset of the plurality of paths comprise programming instructions that are configured to cause the processor to, for each of the plurality of the paths:
- identify a source computing device for each of the plurality of paths;
- identify a destination computing device for each of the plurality of paths;
- using information corresponding to desired access for the source computing device and information corresponding to permitted access for the destination computing device to determine whether network traffic is allowed on a path; and
- discard the path if network traffic is not allowed.

17. The system of claim 11, wherein the information corresponding to the IP definition of the computing device comprises a query to a data source for one or more of the following: an IP address of the computing device, a domain name, or a media access controller (MAC) address.

18. The system of claim 11, wherein the information corresponding to desired access of the computing device comprises one or more of the following:
- identifying information of one or more destination computing devices that the computing device wishes to connect to;
- identifying information of one or more services of the one or more destination computing devices that the computing device wishes to connect to;
- permitted protocol information corresponding to the one or more services; or
- permitted port information corresponding to the one or more services.

19. The system of claim 11, wherein the information corresponding to permitted access of the computing device comprises one or more of the following:
- identifying information of one or more services provided by the computing device;
- identifying information of one or more source computing devices to which the computing device grants access permission to;
- permitted protocol information corresponding to the one or more provided services;
- permitted port information corresponding to the one or more provided services; or
- a time limit for each of the one or more provided services.

20. The system of claim 13, wherein the request for the ACL further comprises information from the data packet, and wherein the information from the data packet comprises one or more of the following:
- an IP address of a source computing device;
- an IP address of a destination computing device;
- a media access controller (MAC) address;
- a time stamp;
- an identifier of the PEP;
- protocol information;
- source computing device port information; or
- destination computing device part information.

* * * * *